United States Patent [19]
Jitaru et al.

[11] Patent Number: 5,434,768
[45] Date of Patent: Jul. 18, 1995

[54] FIXED FREQUENCY CONVERTER SWITCHING AT ZERO VOLTAGE

[75] Inventors: Ionel Jitaru, Tucson, Ariz.; Beldianu Vasile, Bucharest, Romania

[73] Assignee: Rompower, Tucson, Ariz.

[21] Appl. No.: 16,885

[22] Filed: Feb. 12, 1993

[51] Int. Cl.$^6$ .......................................... H02M 3/335
[52] U.S. Cl. ...................................... 363/21; 363/97; 363/131
[58] Field of Search ..................... 363/17, 21, 24, 91, 363/97, 127, 131

[56] References Cited
U.S. PATENT DOCUMENTS

| | | | |
|---|---|---|---|
| 4,058,758 | 11/1977 | Peterson | 363/25 |
| 5,113,334 | 5/1992 | Tuson et al. | 363/25 |
| 5,126,931 | 6/1992 | Jitaru | 363/21 |
| 5,132,889 | 7/1992 | Hitchcock et al. | 363/17 |
| 5,267,133 | 11/1993 | Motomura et al. | 363/21 |

*Primary Examiner*—Thomas M. Dougherty
*Assistant Examiner*—Adolf Berhane

[57] ABSTRACT

A converter is operated with a main switch in series circuit with primary winding of the isolation transformer and an auxiliary switch for charging a reset capacitor also in circuit with the primary winding. The main switch and auxiliary switch are operated through control logic so that neither switch is ON at the same time. A predetermined dead time is provided between turning OFF the auxiliary switch and turning ON the main switch to allow the output capacitance of the main switch to discharge to zero. The power is transferred to the output during the ON and OFF time of the main switch. The power can be transferred to the output also during only the off time. In the case when the power is transferred from the primary to the secondary during both ON and OFF time, an inductor or a saturable reactor is series circuit with the secondary or a selectively controlled rectifier is used.

22 Claims, 13 Drawing Sheets

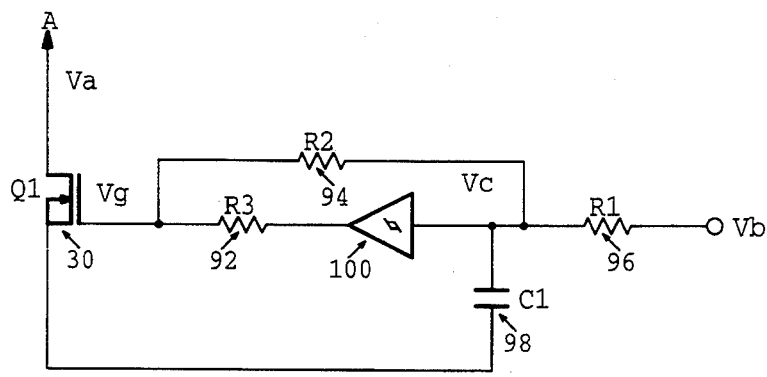
FIG. 6
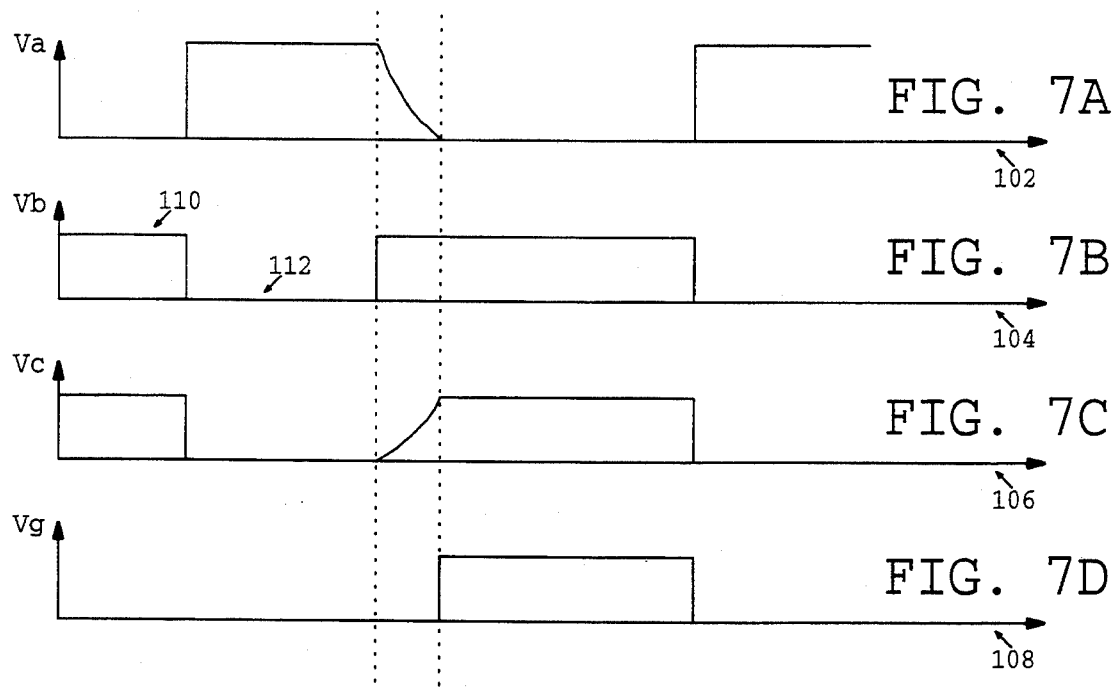
FIG. 7A
FIG. 7B
FIG. 7C
FIG. 7D

FIXED FREQUENCY CONVERTER SWITCHING AT ZERO VOLTAGE

BACKGROUND OF THE INVENTION

1. Field of the Invention

This invention relates to DC-to-DC converters, DC-to-AC inverters and AC-to-DC converters. The major characteristic of this power conversion technique is that transfers the power to the secondary continuously, and the switching elements switch at zero voltage.

2. Description of the Prior Art

There is a continuing industry demand for increasing power density, which means more power transferred in a given volume. A method for increasing the power transfer through the converter is to increase the switching frequency in order to minimize the size of magnetic and the capacitors. Using prior art topologies such as forward or flyback, which employ "hard" switching techniques, makes high frequency operation less efficient. The switching losses associated with switching elements, which turn on when there is a voltage across them, are proportional with the switching frequency. An increase in switching frequency, leads to an increase in switching losses and an increase in level of electromagnetic interference (EMI). In order to overcome limitations in switching speeds, the prior art has devised a new family of resonant and quasi-resonant converters. In the case of quasi-resonant converters, the prior art technique consists of shaping the current or voltage to become half sinusoidal and to perform the switching when the current or voltage reaches zero. The reactive elements which contribute to shaping the current or voltage are part of the basic circuit and are considered undesirable in classic topologies. An example of one such circuit can be found in Vinciarelli, "Forward Converter Switching at Zero Current", U.S. Pat. No. 4,415,959. The technique utilized by Vinciarelli consists of adding a resonant capacitor across the fly wheeling diode to create a resonant circuit in combination with the leakage inductance of the transformer. During the ON time of the main switch, a current charges the resonant capacitor. When the current reaches zero, the main switch turns OFF in the primary of the transformer. The output inductor discharges the resonant capacitor, transferring the energy to the load. This topology eliminates part of switching losses which allows the converter to run at a high frequency. However, this topology exhibits several drawbacks which limit its utilization to power under 200 W. The peak current in such a quasi-resonant converter is significantly large if a large input voltage range is required. The energy is transferred in stages from the input to the resonant capacitor and then from the resonant capacitor to the output. Due to the fact that the main switch in the primary turns ON at zero current and non zero voltage, the energy contained in the output capacitance of the switch is dissipated. The output power is varied by varying the frequency. A certain amount of energy is transferred from the input to the output at every cycle and when the power requirements are high, the repetition frequency is correspondingly high. However, the modulation in frequency does not allow significant decrease of the output filter size. A large electromagnetic interference (EMI) filter is required to avoid beat frequency problems between the units, if two non-synchronized units are used together.

Another family of quasi-resonant converters which switch at zero voltage is described by F. C. Lee in High Frequency Power Conversion International Proceedings (April 1987), Intertec Communications, Ventura, Calif. These prior art circuits operate similarly to those described above with the exception that the main switch turns ON and OFF at zero voltage. This has the advantage of eliminating the losses caused by the discharged of the capacitance of the switch at turn ON and also decreases the driving current utilized in the MOSFET switch due to the elimination of the Miller effect. However, the voltage across the main switch and the frequency modulation which is required for controlling the output power makes this topology unattractive.

An additional group of quasi-resonant converters includes the multi-resonant converters such as were described at the High Frequency Power Conversion International Proceedings (May, 1988), Intertec Communications, Ventura, Calif. While operating similarly to other quasi-resonant topologies, a secondary resonant circuit is employed to decrease the stress across the output rectifier and to reduce frequency swings over various input-output conditions of operation.

Another drawback associated with prior art power conversion technique is the fact that the power is transfer to the secondary during a portion of the cycle. Common prior art topology such as forward, transfers the power to the secondary during the ON time of the main switch. In the case of flyback converter the power is transferred to the load during OFF time of the main switch. These topologies require large output filters in order to smooth the power transfer to the load.

What is needed is a converter which operate at constant frequency, modulating the power by varying the duty cycle, the current and voltages on the switching elements are square-wave to decrease the current and voltages stress, the transitions are done at zero voltage conditions, and the power is transferred to the output, both during the ON time and OFF time.

BRIEF SUMMARY OF THE INVENTION

The invention utilizes a topology which uses energy accumulated in the magnetic field of the isolation transformer to discharge the output capacitors of the switching elements to zero. In contrast, the prior art technologies the magnetizing energy within the isolation transformer was either recycled back to the input source or in some cases dissipated in a snubber resistor. The discharge of the capacitance of the main switch to zero prior to TURN ON of the main switch has several advantages. For example, losses caused by energy stored in the output capacitance of the main switch are eliminated since they are internally dissipated when the main switch is turned on. Switching noise associated with the Miller effect are eliminated. Current spikes generated at TURN ON of the main switch due to parasitic capacitance of the transformer is eliminated. A low time rate of charge of the voltage arising from the quasi-resonant discharge of the capacitance of the capacitance of the main switch is reflected as a low rate of change of voltage across the secondary windings. This reduces the current spike across the secondary windings of the transformer due to cross conduction between the main rectifying diode and the fly wheeling diode in the output stage. A slow rate of change of the voltage allows the conducting diode to recover from conduction.

During the ON time of the main switch the converter transfers the power to the secondary as a forward converter, and in the same time accumulates energy in the magnetic field of the main transformer. During the OFF time the energy contained in the magnetic field of the transformer is transferred to the output, operating as a boost converter. One of the major advantages of this topology is the fact that minimizes the output filter, due to a continuous transfer of energy. Another advantages of this power processing technique is that the power can be transferred to the output even for very low input voltages, where the converter operated only in boost mode. This makes this topology a perfect candidate for Power Factor Correction, where the input current is control in a such way to be proportional with the input voltage. The operation in this case may require discontinuous current through the output inductor. This feature gives to this technology a significant advantage over the single ended forward converter, where the power cannot be transferred to the secondary if the output voltage reflected in primary exceeds input voltage.

The power transfer to the output is modulated by varying the duty cycle, as is commonly used in constant frequency converters. The main switch is turned OFF prior to the voltage being built up across it. This is accomplished by a fast TURN OFF scheme and also by using an external capacitor connected across the main switch. Energy accumulated in the capacitor is not discharged through the main switch, but is cycled back to the input source.

The energy contained in the leakage inductance of the transformer is not dissipated but is also recycled back to the output and input voltage.

The transformer's core is reset via the secondary switch and the diode in parallel with it. One consequence of this resetting technique is the minimization of the voltage stress on the primary switch. A constant voltage is applied across the primary switch during the OFF time which is tailored to provide a complete reset of the core, without any dead time. The duty cycle is not limited to a 50% constraint which is imposed by most prior art techniques. The condition necessary to achieve zero voltage switching is also independent of the output current. In contrast, prior art, zero current crossing, resonant converters limit the output current in order to achieve a zero current crossing condition.

As a result of the invention switching losses are virtually eliminated; noise in the primary and secondary of the isolation transformer is significantly decreased; the voltage across the main switch is minimized; limitation on the main switch duty cycle due to transformer core saturation are avoided; constrains on the upper level on the output current are avoided; the continuous transfer of energy to the secondary over entire cycle, minimizes the output filter; due to buck and boost mode of operation the input voltage range can be very large; due to operation as boost converter at low input voltage the topology is suitable for Power Factor Correction; the secondary can be obtained as tapped winding or can be separate windings, which gives a lot of design flexibility; and the circuit does not require special components typical for resonant converters such as resonant capacitors with very low equivalent series resistance.

The invention is a DC-AC or DC-DC converter comprising a DC voltage source and a transformer having a primary and secondary or secondary windings. A main switch selectively couples the voltage source across the primary winding of the transformer. An auxiliary switch selectively allows a path for the magnetizing current and leakage inductance current to the reset capacitor. In the second half of OFF time the current flows from the reset capacitor through secondary switch and primary winding to the input source. At the moment when the secondary switch is turned off the current flowing through the primary winding of the transformer will continue to flow via the output capacitance of the primary switch. In this way the voltage across the main switch is discharged to zero. The control circuit senses the voltage across the main switch and turns the main switch on after the voltage across it reaches zero. In the case where a MOSFET is used as the main switch, the body diode will conduct after the output capacitor of the main switch is discharged. However when the voltage in secondary becomes positive and turns on the output rectifier the resonant circuit created by the primary inductance and the output capacitor of the main switch will be damped, and as result the voltage across the main switch will not reach zero. This is the reason the third switch is required, in order to prevent the current flow into the secondary during the transition time, time when the voltage across the main switch goes to zero. The third switch becomes conductive when the voltage across the primary switch reaches zero. A control circuit selectively operates the main switch, the auxiliary switch and the third switch to transfer energy through the converter by modification of the duty cycle of operation of at least the main and auxiliary switch to achieve turn ON of the primary switch at zero voltage.

The converter further comprises a discrete, reset capacitor in parallel with the primary switch.

The tapped secondary winding allows transfer of energy to the lead during the ON time and during the OFF time of the main switch. This leads to a minimization of the output filter. The value of the output choke and of the output filter can be significantly decreased. In the case of center tapped output winding and 50% duty cycle for the main switch, there is not need for the output inductor due to a constant and continuous power transfer.

In an embodiment the tapped secondary winding is replaced by a single winding and a bridge rectifier. This approach is suitable for high output voltage applications.

The delay of the current in secondary during the forward mode of operation can be accomplished in several ways. One of the embodiments suggest the use of a constant volt-second saturable reactor. Another embodiment suggest the use of a simple inductor in series to the secondary winding or in series with the primary winding. The discrete inductor added in series with the primary or secondary winding can be replaced by a large leakage inductance between primary and secondary windings.

In another embodiment the third switch comprise a unidirectional controlled switch. The unidirectional controlled switch circuit is selectively operated by the control circuit so that it is conductive after the voltage across the main switch reaches zero.

In one embodiment the delay of the current in the secondary is accomplished by a capacitor connected in between the tap of the secondary winding and the common cathode if the output rectifiers.

In one embodiment the secondary winding is not tapped and the power transfer to the secondary is accomplished during the OFF time of the main switch.

The control circuit senses the output voltage across the load. The control circuit maintains a constant voltage across the load by varying the ON period of the primary switch, the third switch or both. The third switch is an inductor, a saturable inductor or a synchronized rectifier. The converter further comprises a voltage reference. The control circuit compares the difference in voltage across the load and the voltage reference. The difference is compared to a signal which is proportional to the current through the primary switch or a sawtooth signal. In this way the duty cycle of the driving pulses are modulated in order to minimize the voltage difference between the voltage reference and a voltage proportional to the output voltage. The control pulses are driving both main with and auxiliary switch complimentary and delays the turn ON of the main switch until the voltage across it reaches zero. During the ON time of the main switch the energy is transferred to the secondary in forward mode and during the OFF time of the main switch the energy is transferred to the secondary in a flyback mode. The continuous energy transfer leads to the minimization of the output filter. This is possible due to the fact that the main transformer acts also as a energy storage tank during the ON time of the main switch. The energy accumulated in the transformer's magnetic field is transferred to the output during the OFF time.

The invention can be better visualized by turning to the following drawings:

BRIEF DESCRIPTION OF THE DRAWINGS

FIG. 6 is a schematic diagram of the zero voltage detection technique used to control the turn ON of the main switch.

FIG. 7 is a timing diagram of the circuit of FIG. 6.

The invention and its various embodiment may be better understood by now turning to the following detailed description.

DETAILED DESCRIPTION OF THE PREFERRED EMBODIMENTS

A double ended converter or a single ended flyback DC-DC or DC-AC converter is operated with a primary switch in series circuit with a primary winding of the isolation transformer and an auxiliary switch for charging a reset capacitor also in circuit with said primary winding. The main switch and auxiliary switch are operated through control logic so that neither switch is ON at the same time. A predetermined dead time is provided between turning OFF the auxiliary switch and turning ON the primary switch to allow the output capacitance of the primary switch to discharge into the input source. Current discharge into the secondary of the transformer during this time period is limited by a third switch, which may either be a saturable reactor in series circuit with the secondary, a normal inductor, a leakage inductance of the transformer or of the output inductor, discontinuous mode operation or a selectively controlled switch. The delay in the secondary can be accomplished also by using a capacitor in between the common cathodes of the diodes and the secondary tap. This technique is based on the need to supply energy to the output choke during transitions time, to avoid the turn ON of the forward diode prior the voltage across the main switch reaches zero.

The resetting scheme methodology utilized in connection with the converter of the invention can be understood by first considering prior art resetting methodologies, such as described by Vinciarelli, "Optimal Resetting of the Transformer Core in Single Ended Forward Converters", U.S. Pat. No. 4,441,146 (1984). FIG. 2A and 2B illustrate this prior art current mirror methodology. An equivalent topology is shown in FIG. 3b taken from Barn, "Full-Fluxed, Single-Ended DC Converter", U.S. Pat. No. 4,809,148 (1989) where the series combinations of the capacitor and auxiliary switch are coupled to the negative rail rather than the positive rail as shown in FIG. 2A taken from Vinciarelli. For the sake of discussion leakage inductance, winding capacitance and other parasitic elements reflected from transformer 60 are ignored. At the time T2 in FIG. 4, the switch 30 in FIG. 1 turns ON and DC voltage Vin is impressed upon the primary winding 40 of the transformer 60 causing a magnetic flux to be propagated across the core 58 of the transformer. If N is the number of primary turns, the total change in flux is $Vin(T3-T2)/N$.

Figure 3:
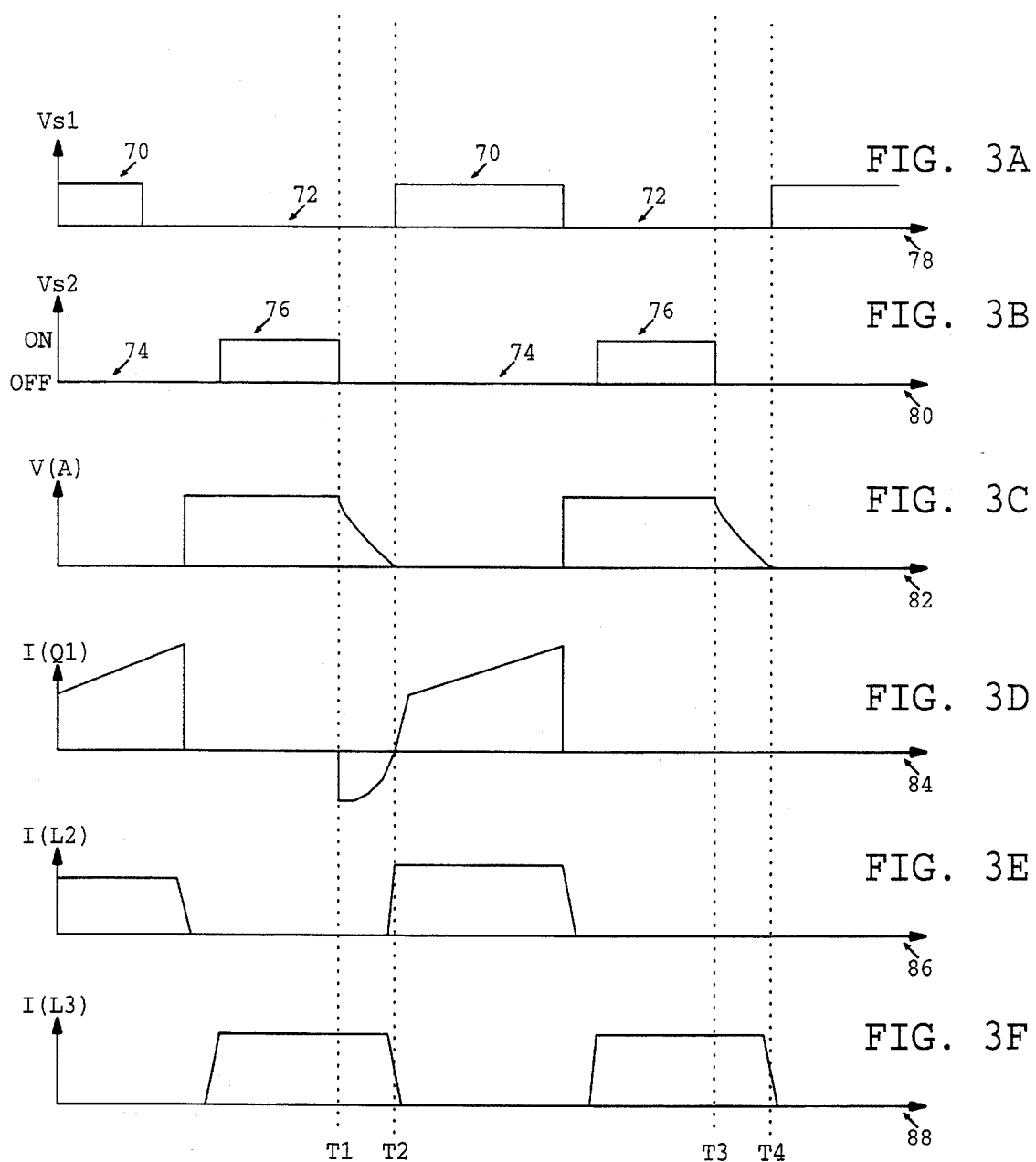
FIG. 3 is a timing diagram of the circuit of FIG. 1.

At T3 in FIG. 3, switch 30, Q1, turns OFF and diode 34, D1, turns ON. Current then flows into capacitor 38. The energy stored in the magnetizing inductance of the transformer 60 is then transferred into the capacitor 38. After several cycles, the voltage across 38 reaches a level Vr which is function of the input voltage, Vin, and the duty cycle, D, of the switch 36 as $Vr=Vin/(1-D)$.

In the example, the resonant frequency defined by capacitor 38 and the magnetizing inductance Lm is assumed to much lower than the repetition frequency at which switches 36 and 34 are open and closed. As result the voltage across 38 does not change during the OFF period of switch 30.

In steady state mode of operation the switch 32 is turned ON at T4 in FIG. 3. At that time D1 was conducting, which makes that the switch 32 to turn ON under zero voltage conditions. At the second half of the OFF time for the switch 30, the current is flowing through switch 32, capacitor 38 and the primary winding 40, L1, towards the input source 56. At the moment T1, when the switch 32,Q2, turns OFF the current through L1 continues to flow towards the input source 56, but via a different path. This path is formed by the output capacitance of the switch 30, which is 36, and primary winding 40. In this way in between T1 and T2 of FIG. 3, the output capacitance of switch 30 is discharged to zero. Further the current through winding 40, would flow through the body diode of switch 30. At time T2, the main switch turns ON under zero voltage conditions. At the time in between T1 and T2 the voltage across the main switch 30, will become equal to the input voltage. At that time the voltage in secondary across 42,L2, and 44, L3, will change the sign, becoming positive in the anode of D2. In the case when D2 turns ON prior the voltage across 30 reaches zero, the secondary circuit via ,18, 52, and 54 will damp the resonant circuit formed by 40 and 36, and as effect the voltage across 30 will not reach zero. This can be also explained by the fact that the current flowing from 36 through 40 towards 56 would be steered towards 48 and 52, at the moment when 48 starts to conduct. In this way there will not be enough current to discharge the 36. Because this phenomenon there is a need for a delay of the current flowing through 48 during the transition of the voltage across 30 and 36 from $Vin/(1-D)$ to zero. The methodology of the prior art does not achieve zero voltage switching of the main switch 30. This result in increased stress on switch 10 and higher power losses in the converter. Avoiding cross conduction between the main switch and auxiliary switches as claimed by Vinciarelli'146 and others does not achieve the advantages of zero voltage switching as practiced in this invention. A significant difference in between the Vinciarelli's U.S. Pat. No. 4,441,146 and this converter topology is the means of power transfer from the primary to the secondary. Vinciarelli applies the resetting technique to a single ended forward converter. In one single ended forward converter the power is transferred from the input to the output during the ON time of the main switch. In the present invention the power is transferred from the input to the output during the full cycle. The power transfer is performed during the ON time as a forward converter and during the OFF time as a boost converter. The continuous transfer of power from input to the output leads to a minimization of the output filter requirements, which means a higher power density capability.

In the following calculation is assumed that the drain to source output capacitance of switch 30 and 32 is constant. Also is assumed that the current through the saturable reactor 46 is negligible for a period of time when the voltage across switch 30 decreases to zero. In order for the switch 30 to turn ON at zero voltage the following equation has to be satisfied:

Im Lm > C2 Vr where $Vr=Vin/(1-D)$ and Im is magnetizing current at the moment when switch 32 turns OFF.

During the ON state of the main switch 30, the magnetizing current varies by amount dI and $Im=dI/2$. The current variation dI is determined by the magnetizing inductance, input voltage and the ON time of the main switch 30. Returning to the inequality above and substituting the expressions for the resetting voltage Vr and magnetizing current Im result in the inequality:

Fr < D(1−D) f/2 where Fr is the repetition frequency and f is the resonant frequency of the circuit which involves Lm and C2. The quantity D(1−D) has a maximum value at D=0.50. Therefore, main switch 30 will turn on at zero voltage provided that repetition frequency is less than a certain factor of the resonant frequency. If is considered that the saturable reactor has a constant volt-second capability, the most critical condition for zero voltage switching is therefore experienced at high input voltage. From the above relationship it can be concluded that zero voltage switching occurs independently of the magnitude at the output current.

Figure 1:
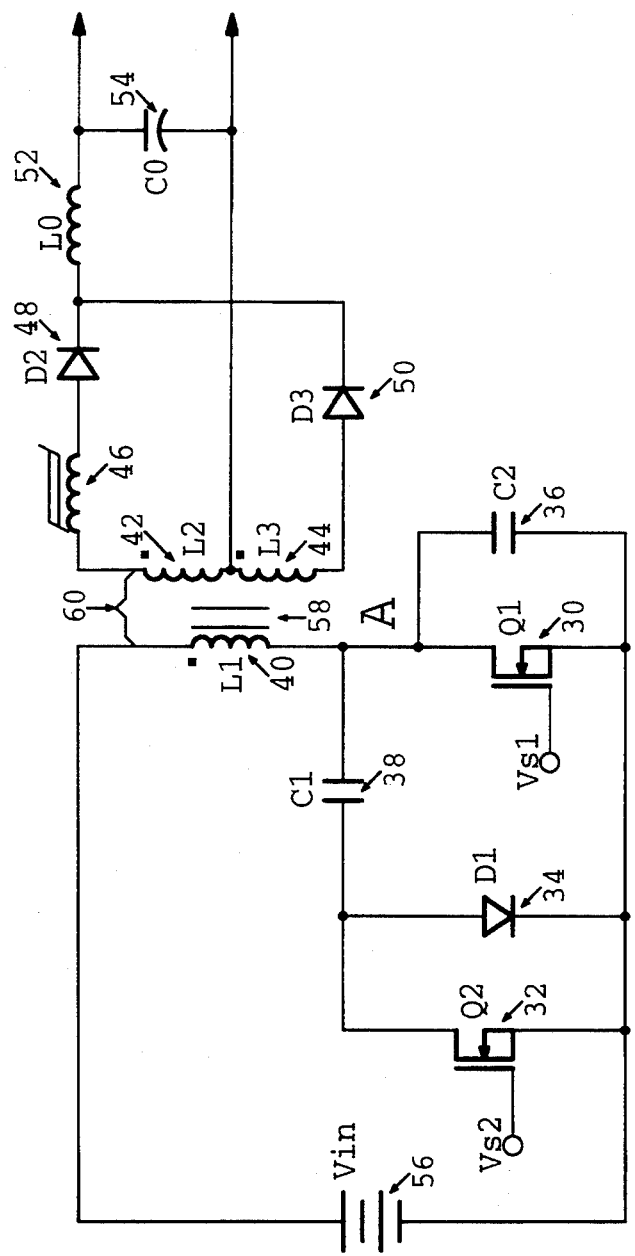
FIG. 1 is a schematic of a converter utilizing the power transfer methodology of the invention.
Figure 2A:
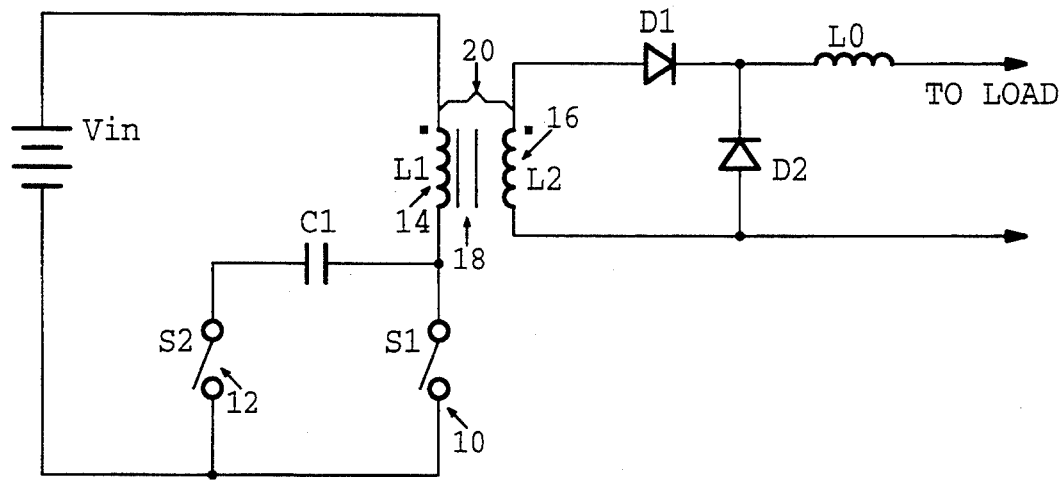
FIG. 2A is a schematic diagram wherein the current mirror resetting technique of prior art is illustrated for a single ended forward converter.
Figure 2B:
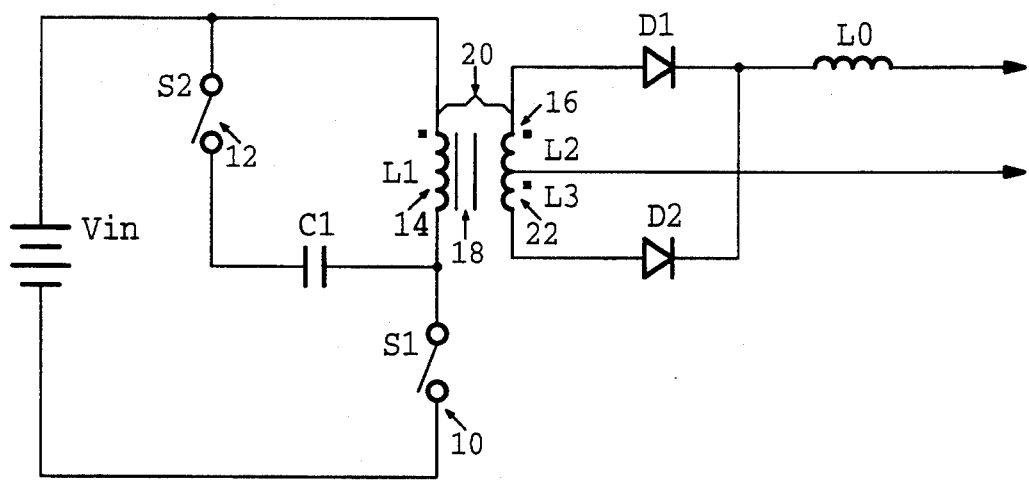
FIG. 2B is a schematic diagram wherein another prior art technique is illustrated.

The operation of the circuit of FIG. 1 is illustrated in the timing diagram of FIG. 3. Curve 78 is the gate voltage applied to main switch 30 illustrating On state periods 70 and Off state periods 72. Curve 80 similarly corresponds to the gate voltage applied to secondary switch 32. Off periods 74 are alternated with On state periods 76. As can be seen by comparing curves 78 and 80, a time gap T or "dead" time is provided between T1 and T2 following an ON state 76 of secondary switch 32 and before ON state 70 of main switch 30.

Curve 82 represents the voltage across the main switch 30, and can be seen that at the time T1, when the auxiliary switch 32, ceases to conduct, the voltage starts to decay to zero in a resonant manner. This allows the main switch 30, to turn ON at zero voltage at the moment T2.

Curve 84 represents the current flowing through the main switch 30 and the capacitance 36, which can be its own parasitic capacitance or a additional discrete capacitor. As can be seen, in between T1 and T2 the current flows through output capacitor 32, till the voltage across it reaches zero. At that moment the main switch turns ON and the current becomes positive.

The curves 86 and 88 represent the currents through the rectifiers 48 and 50. As can be seen the current through 48, starts to rise prior the voltage across the main switch 30 reaches zero. This is accomplished by the saturable reactor 48.

Unlike prior art resetting methodologies, such as described by Vinciarelli in U.S. Pat. No. 4,441,146, the flux through the transformer's core 58 is not symmetrical. During the OFF time of the main switch 30, the current flowing through rectifier 50 and output inductor 52, crates a DC component for the magnetic flux. As result the transformer 60 is not used only as means for power transfer like single ended forward converter, but also is used as a storage element. This feature is very important due to the fact that allows a much smaller output inductor 46. Having two storage elements 60 and 46 means a better utilization of the transformer 60. The RMS current requirements for 54, Co, are also much smaller due to the continuous transfer of power from primary to secondary.

If the turn ratio in between the primary winding 40 and forward secondary winding 42, is Nr1 and the turn ratio in between the primary winding 40, and flyback winding ,14, is Nr2, the transfer function from the input to output is described by the following equation:

$$Vo = D(Vin/Nr1) + D(Vin/Nr2)$$

In the case when Nr1=Nr2=Nr the transfer function becomes:

$$Vo = 2D(Vin/Nr)$$

A very effective and simple zero voltage sensor circuit, which is an embodiment, is presented in FIG. 6. The circuit consist in a delay cell created with 96, R1, and 98, C1, and the driver element 1130. There is a feedback resistor 94, R2, which plays a key role in operation. After the auxiliary switch 32, ceases to conduct, the voltage across main switch 30, starts to decrease, as is depicted buy curve 102 in FIG. 7. The variation of the voltage in drain of the main switch 30, causes a current through drain to gate capacitance, which is directed from the gate towards the source. This current flows through 92 and 94. The portion of current flowing through 94, discharges the filter capacitor 98. As result of it the voltage at the input of 100, is delayed further from reaching the threshold at which 100 is activated. When the voltage in drain of main switch 30, reaches zero or the bottom of the resonance, the current through 94, reaches zero or changes the polarity. This will allow the voltage at the input of 100, to reach the threshold and to turn ON the main switch 30. This circuit has the advantages that senses zero voltage across the main switch 30, by employing a parasitic capacitors of the switch. Conventional techniques require circuitry able to sense the voltage in drain of the MOSFET, and able to sustain high voltage. This circuit does not require any high voltage capability components.

Figure 4:
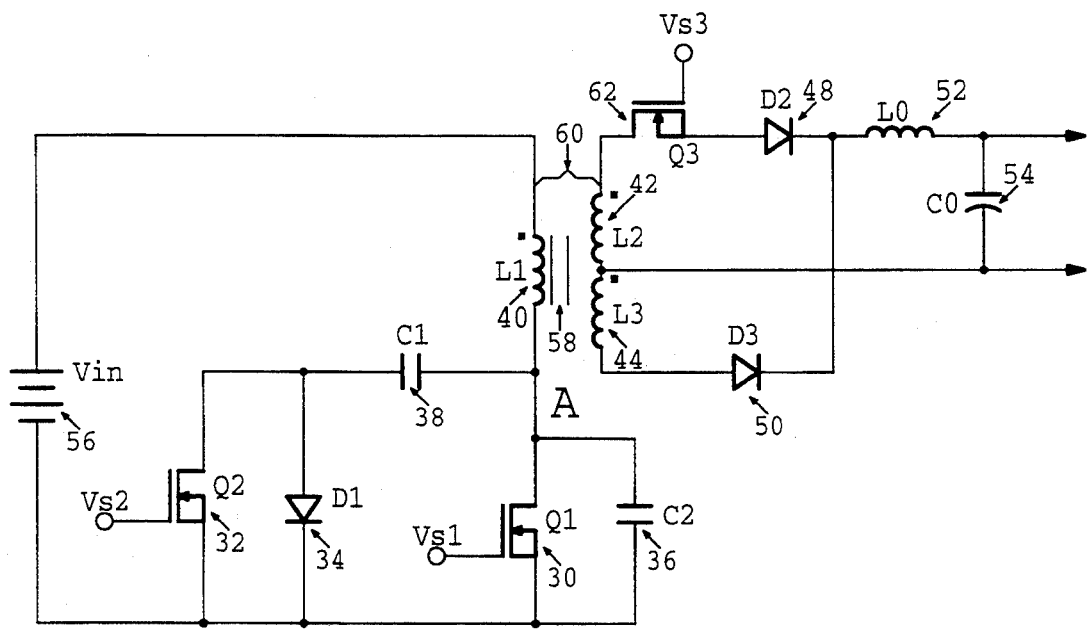
FIG. 4 is a schematic diagram of an embodiment of the invention similar to FIG. 1 where the saturable reactor used as third switch is replaced with a synchronized switch.

FIG. 4 presents an implementation of the circuit from FIG. 1, wherein the saturable reactor is replaced by a synchronized rectifier switch 62. This implementation is advantageous in operation for high output voltages, where the output current are not very high and the volt-second for the saturable reactor 52 of FIG. 1, are large.

Figure 5:
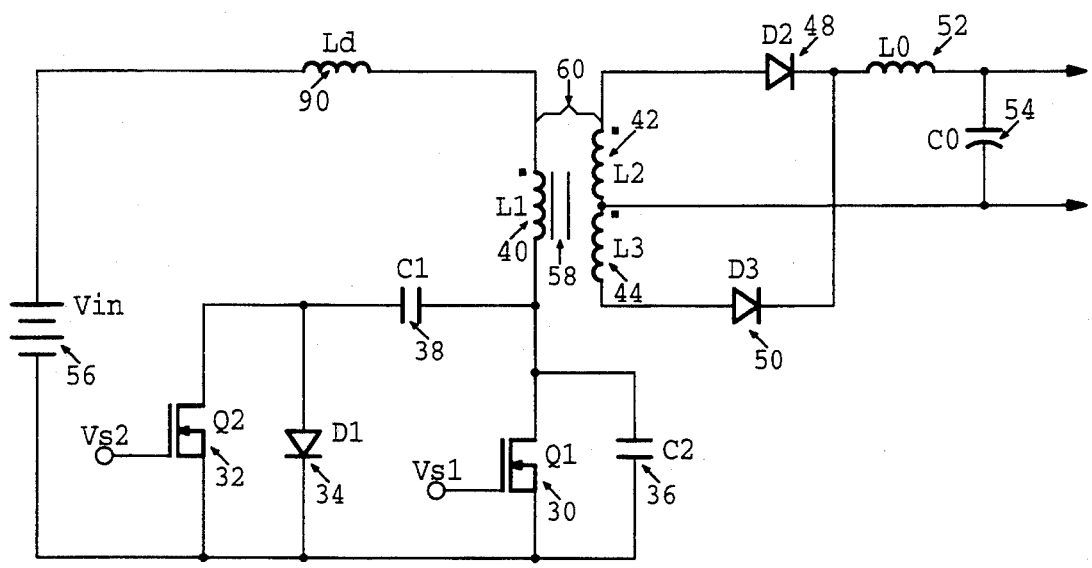
FIG. 5 is a schematic diagram of an embodiment of the invention similar to FIG. 11 where the saturable reactor used as third switch is replaced with a inductor located in series with the primate/winding.
Figure 8:
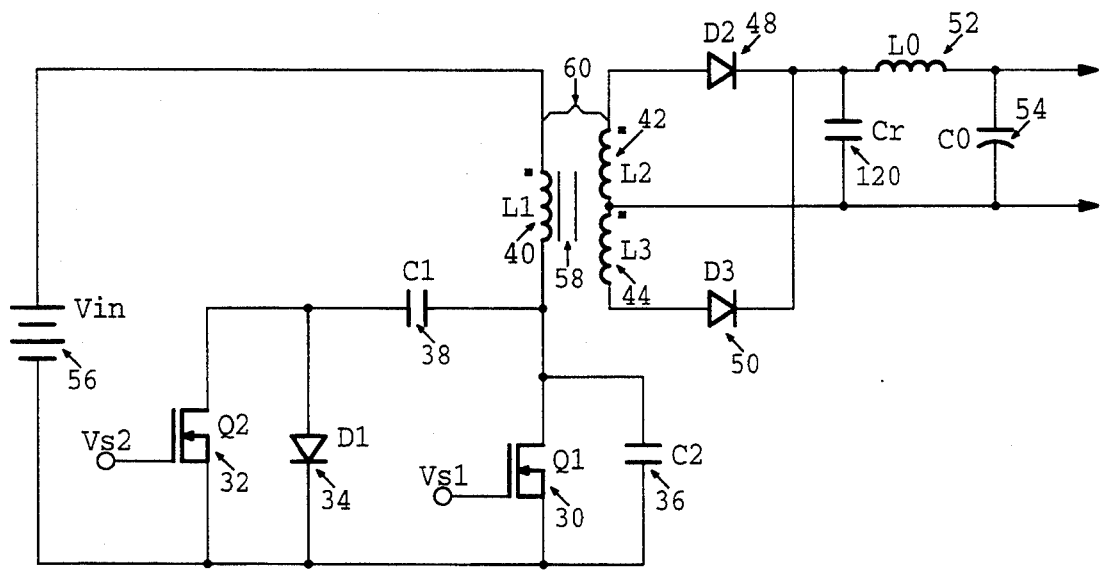
FIG. 8 is a schematic diagram wherein the delay achieved by the third switch is accomplished by using the capacitor Cr.

Another embodiment, is the use of a inductor in the primary side of the circuit, as is presented in FIG. 5. The presence of the inductor 90, is going to ensure the current path through 36, 40, 90 towards the input source 56. This implementation is desirable for application where the currents in primary are not very high, and as result the energy stored in 90, is a small portion of output power. It is important to be mentioned that the energy stored in 90, Ld, is not dissipated or wasted, but only transferred from the input to 38,C1, and then back to the input. In general, to way to maximize the efficiency is by minimizing the circulating currents, in between storage elements. The inductive element 90, can be also placed in the secondary portion of the circuit in series with the secondary winding. It can replace the output saturable reactor but that is going to decrease the efficiency of the converter. In FIG. 8 is presented another technique of creating a delay of the secondary current. The capacitor 120 is placed in between the secondary winding tap and the common cathode of the rectifiers D2 and D3. This output current delay operates as follows. At the moment when the voltage in anode of rectifier 50, decreases the device ceases to conduct. The energy for the output inductor 52, Lo, is provided by the capacitor 120. The voltage across the 120 starts to decay towards zero, but during the transition time, the voltage in anode of D2 has to be larger than the voltage across 120 for 48 to conduct. As result 120, introduces a delay time for the rectifier 48 to turn on. This technique is also suitable for medium and high output voltages.

Figure 9:
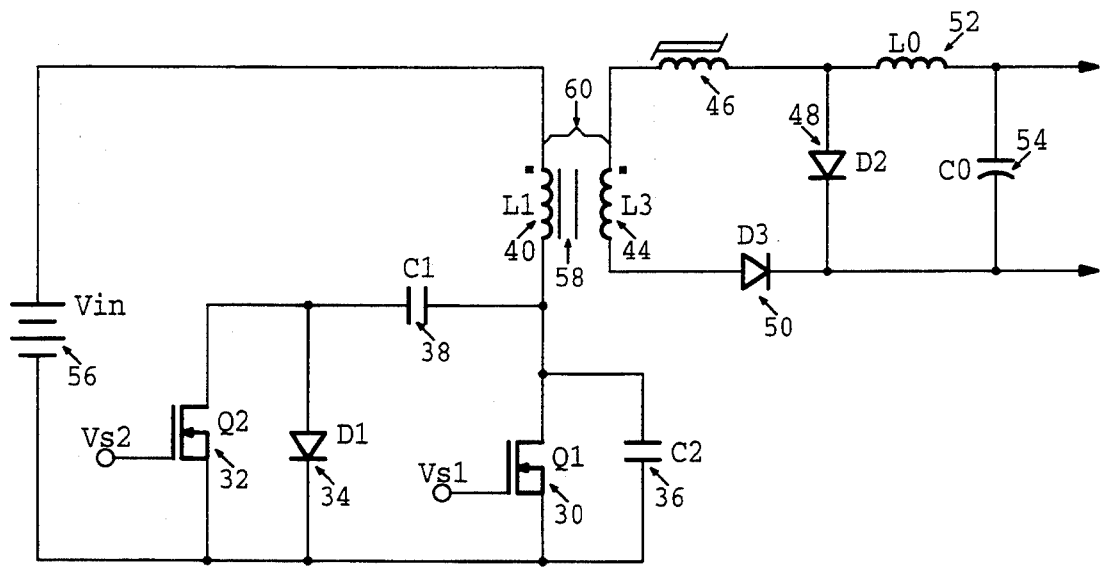
FIG. 9 is a schematic diagram of another embodiment of the invention wherein the tapped secondary winding is replaced by a non tapped winding connected to the secondary rectifiers in flyback mode.

Another embodiment is presented in FIG. 9. This is a derivation of the circuit presented in FIG. 1, wherein the forward portion of the secondary winding is removed. This circuit operates in a boost mode only. The delay circuit 46 is also required to avoid the turn ON of 48, D2, during the transition of the voltage in drain of 30 to zero. This power processing technique is suitable for multiple outputs, where 52, Lo, can be or not a coupled inductor.

Figure 10:
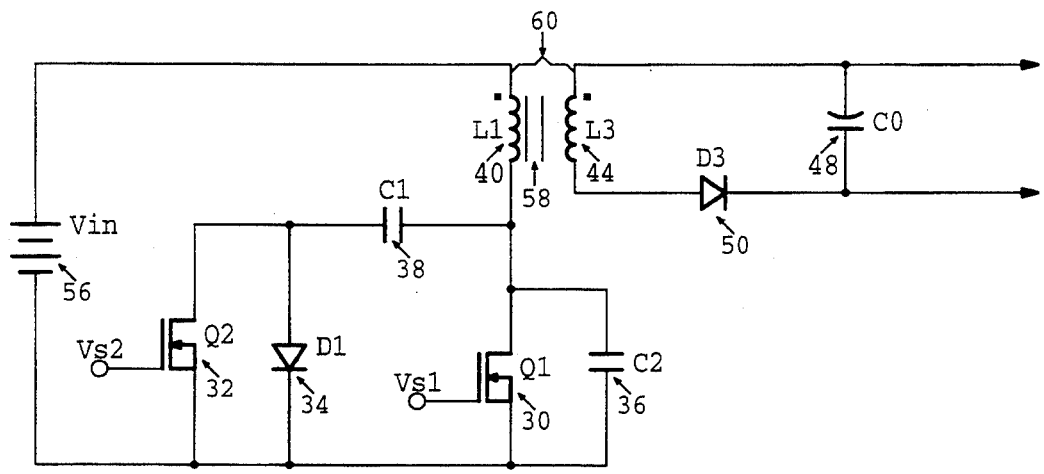
FIG. 10 is a schematic diagram of another embodiment similar to FIG. 9 wherein the power transfer is achieved in a conventional flyback mode.

Another embodiment is presented in FIG. 10. This is derived from the circuit presented in FIG. 9 and represents a flyback configuration, wherein the reset capacitor 38, C1, and the switching elements 34 and 32, create an effective snubber circuit, which recycles the energy contained in leakage inductance of transformer 60, and also offers condition for zero voltage turn On for all the primary switching elements. By sizing the leakage inductance of transformer 60, the output rectifier 50 will have a soft turn off conditions even for flyback continuous mode of operation. As a result of recycling the leakage inductance energy, this circuit is compatible for multiple outputs, with good cross regulation, achieved by implementing a large leakage inductance in between primary and secondary.

Figure 11:
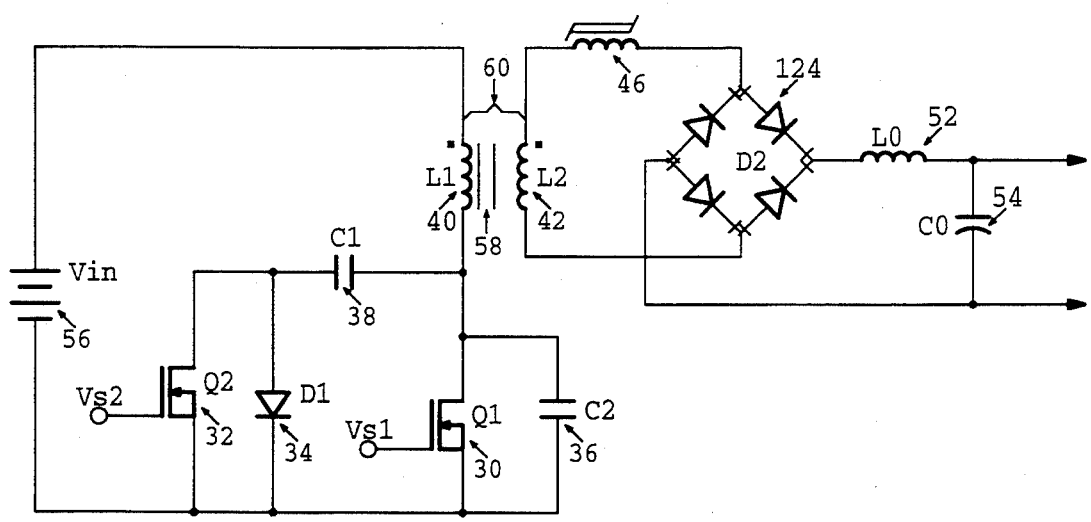
FIG. 11 is a schematic diagram of an embodiment wherein the tapped secondary winding is replaced by a non tapped winding and a bridge rectifier.

In FIG. 11 is presented another embodiment, wherein the tapped secondary winding is replaced by a single winding, and the output rectification is performed by using a bridge rectifier 124. This configuration is compatible for high output voltage applications, where the voltage drop across the output rectifiers is not a concern.

Figure 12:
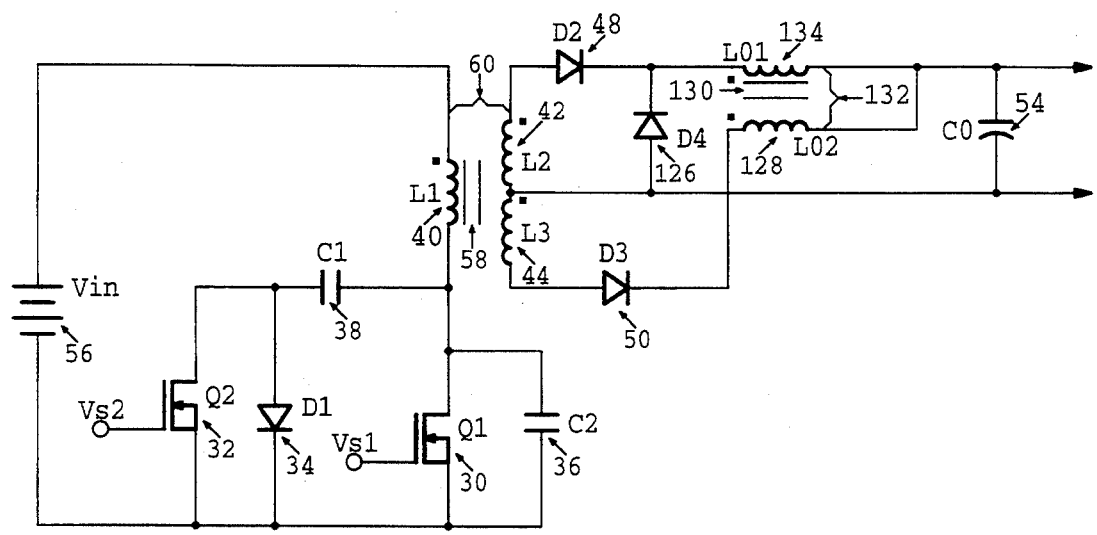
FIG. 12 is a schematic diagram of an embodiment wherein the output choke is split in two coupled inductors, and their leakage inductance is used to delay the current flow into the secondary during the resonant transition.

In FIG. 12 is presented a preferred embodiment in which the current delay in the secondary is achieve by splitting the output inductor in two coupled inductors. The forward current will be shaped in trapezoidal form, which will help not only in delaying the current in secondary, but will create low dI/dt through the output rectifiers minimizing the reverse recovery losses. The leakage inductance energy of the output inductor is not recycled back to primary, but is transferred to the load minimizing the circulating currents and increasing the efficiency.

Figure 13:
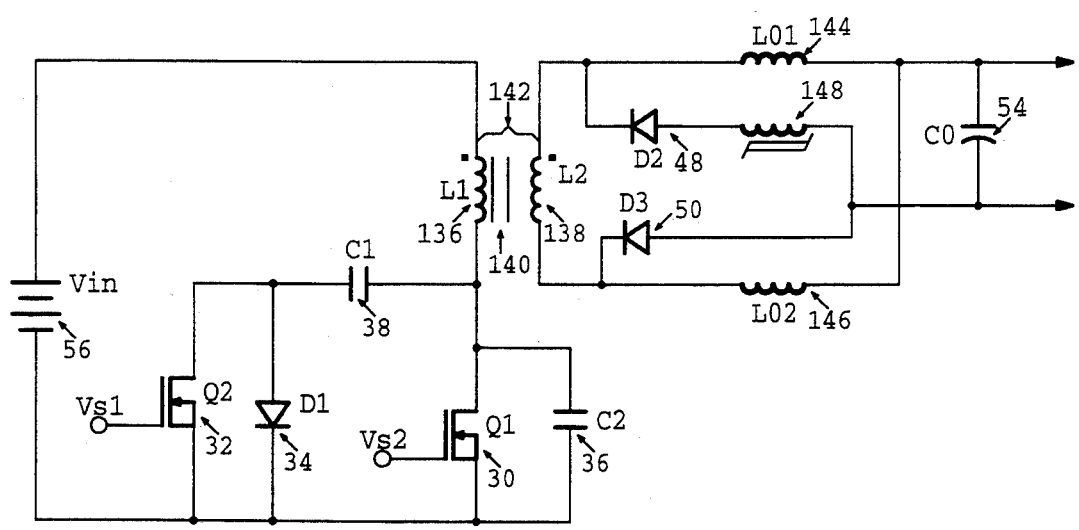
FIG. 13 is a schematic diagram of another embodiment wherein the center tap of the secondary is eliminated and the double rectification in secondary is accomplished by using two inductor elements. The delay of the current flow into the secondary during the resonant transitions is accomplished by using a saturable reactor in series with the flyback output diode.
Figure 14:
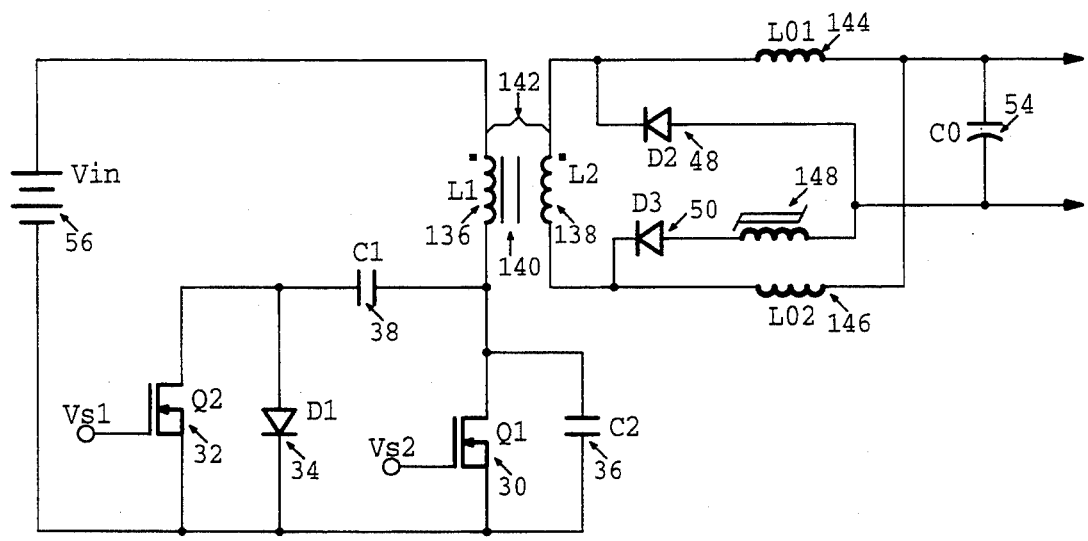
FIG. 14 is a similar configuration as that presented in FIG. 13, with the exception of the saturable reactor location, which is located in series with the forward output diode.
Figure 15:
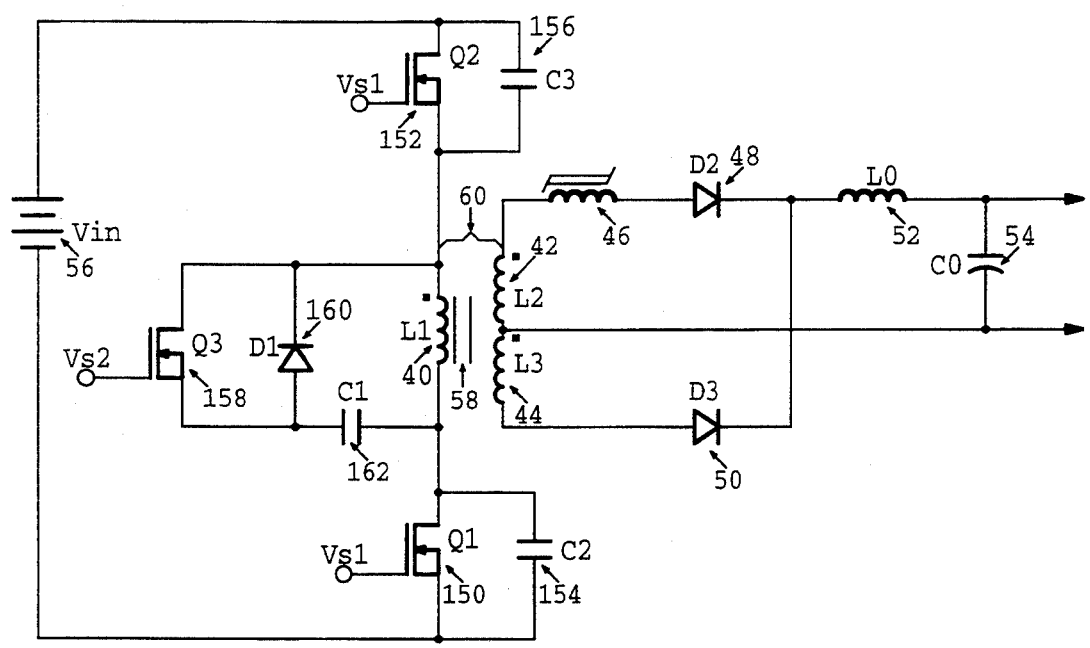
FIG. 15 is a schematic diagram of another embodiment in which the main switch is replaced be two switching elements in series to reduce the voltage stress.
Figure 16:
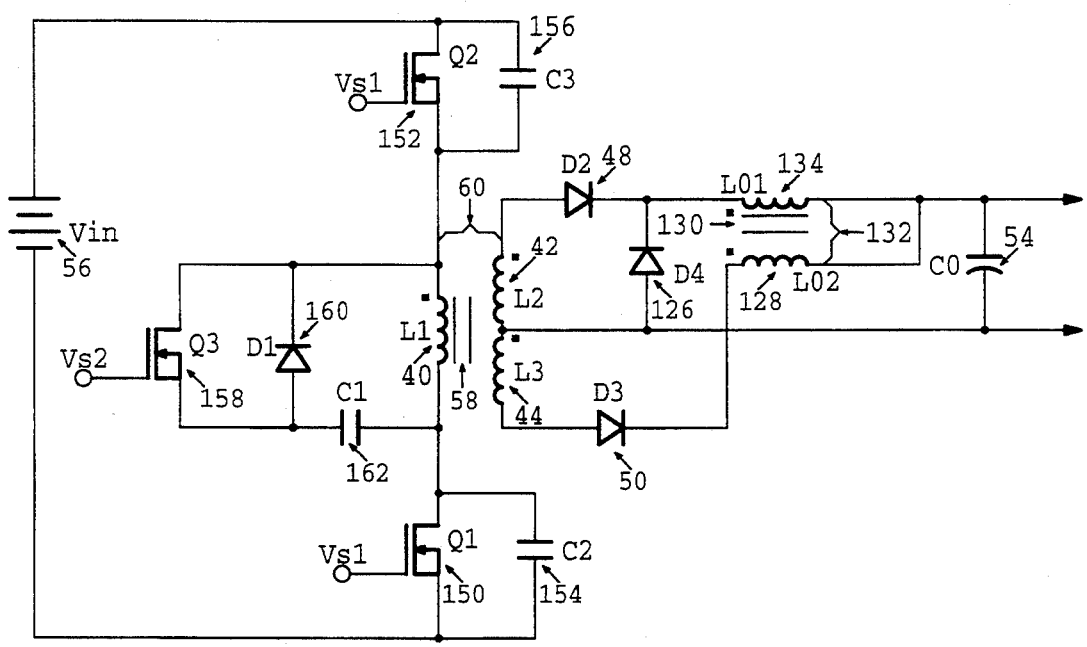
FIG. 16 is a schematic diagram in which the split output inductor is combined with two primary switching elements in series.
Figure 17:
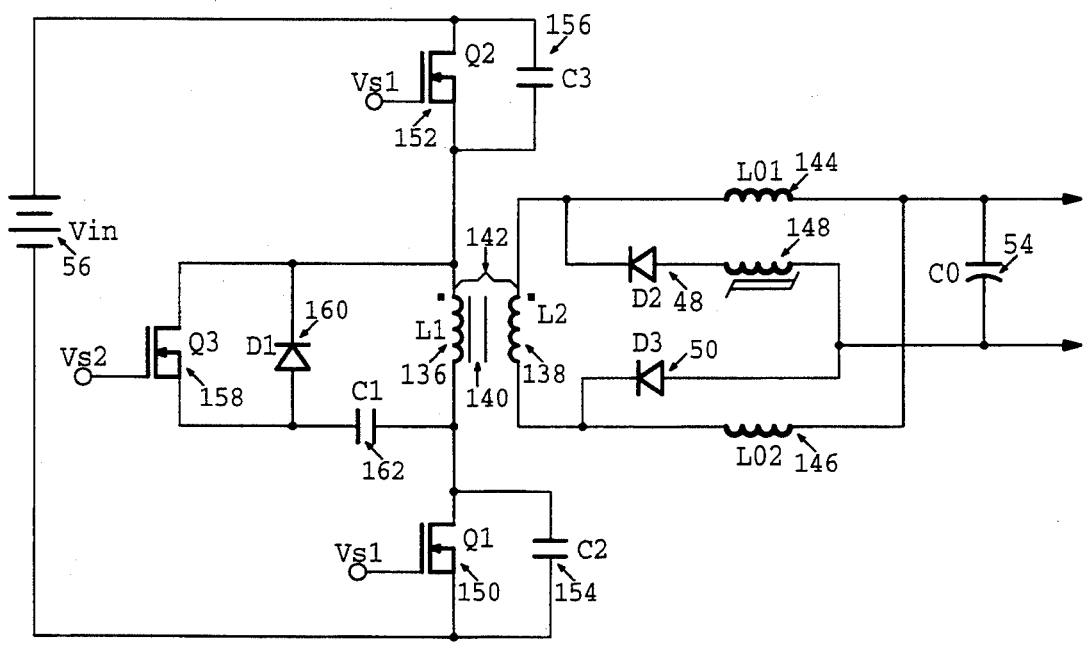
FIG. 17 is a schematic diagram in which the double rectification scheme without the center tap is associated with two primary switching elements in series.
Figure 18:
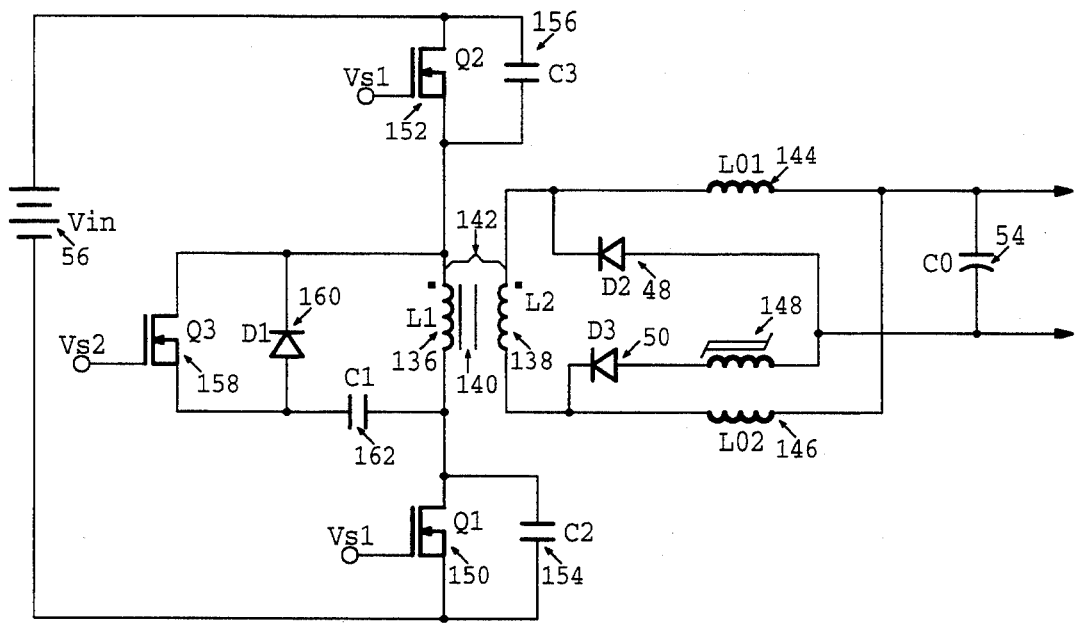
FIG. 18 represent a similar embodiment like the one presented in FIG. 17, with the location of the saturable inductor on the forward output diode.
Figure 19:
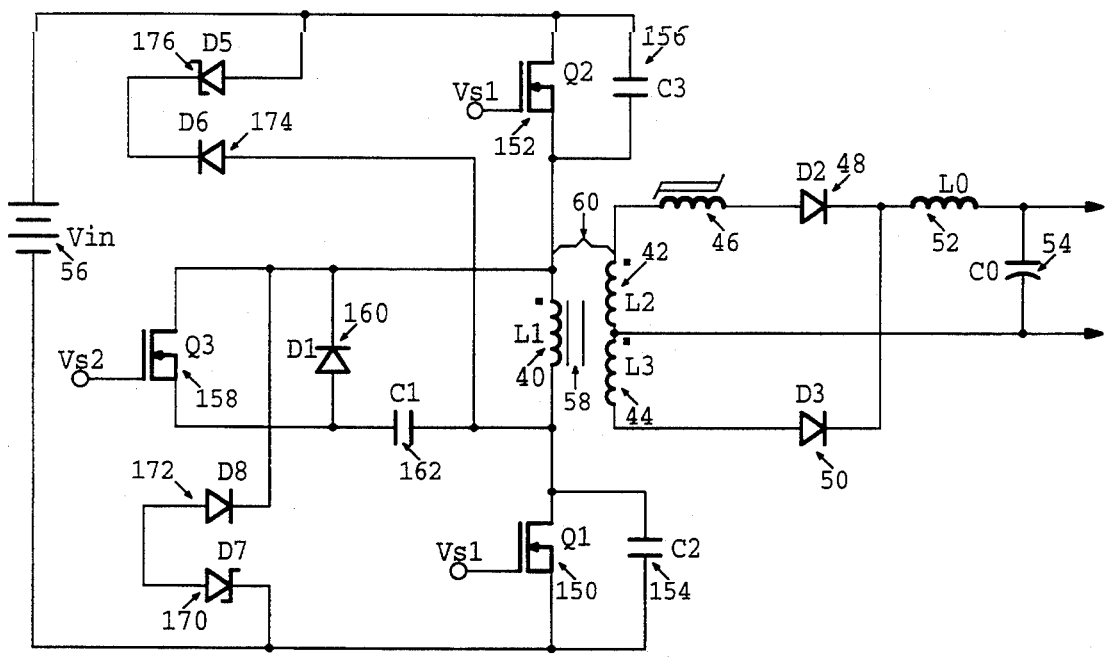
FIG. 19 represents a similar configuration such the one depicted in FIG. 15, with the additions of two sets of diode in primary which will limit the maximum voltage across the primary switching elements.

In FIG. 13, the center tap is eliminated by using two output inductors 144, Lo1, and 146, Lo2. The elimination of the center tap will give a better utilization of the output winding. Two inductive elements do not necessary means two different cores, more than that the configuration is compatible with integrated magnetic as is suggested in FIG. 22. The diodes can be replaced with synchronized rectifiers as is depicted in FIG. 23.

In FIGS. 15, 16, 17, 18, 19, the main primary switch is replaced by two switching elements in series to reduce the voltage stress on each element. The configuration in secondary are similar to those used for only one primary switching element.

Figure 20:
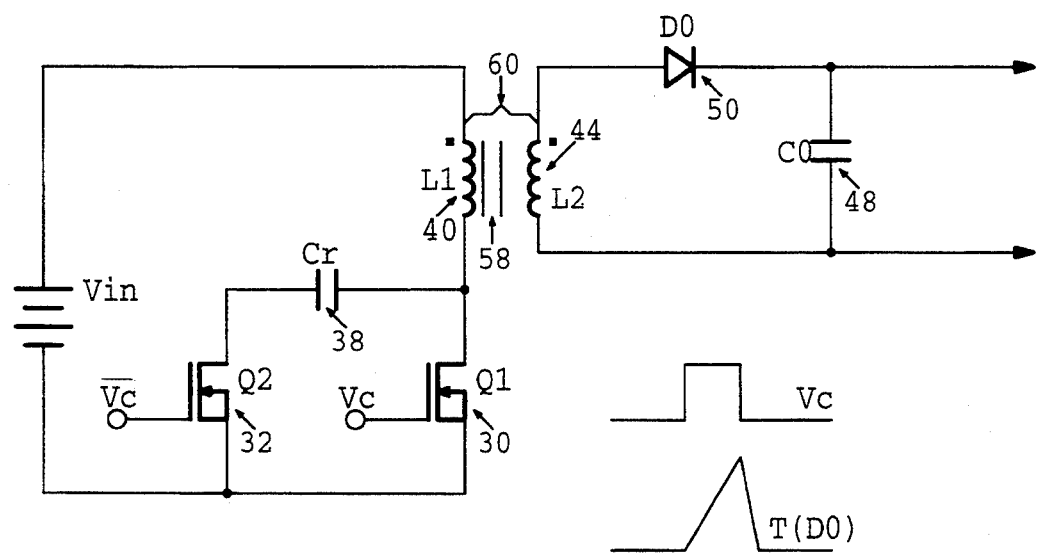
FIG. 20 represents another preferred embodiment in which the power transferred is done through leakage inductance of the transformer in forward mode and the current through the output rectifier has a triangular waveform with both slopes soft.
Figure 21:
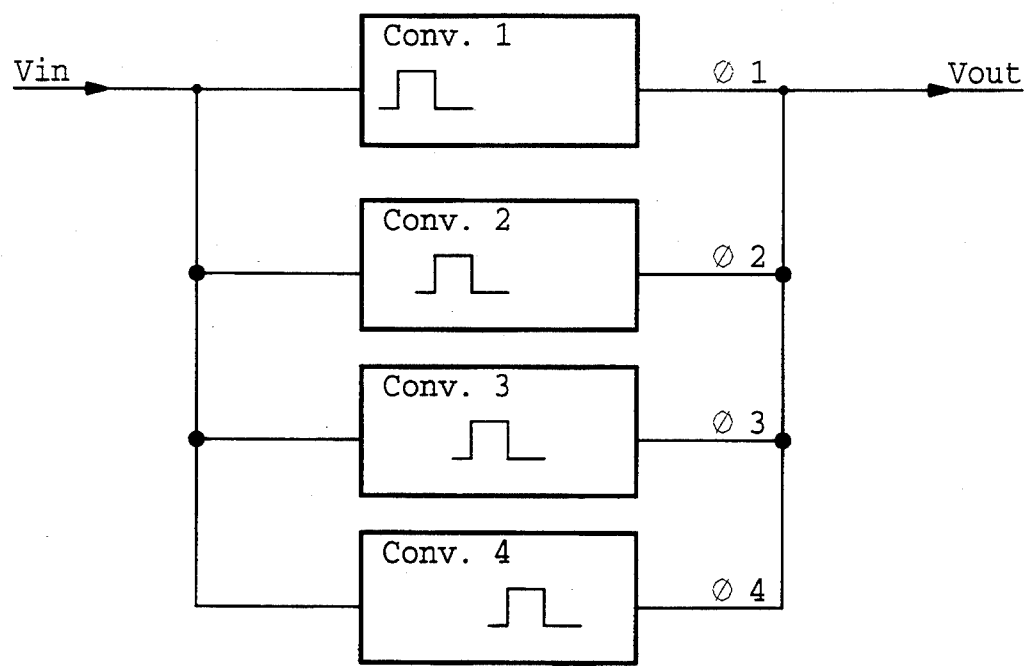
FIG. 21 is an embodiment which represent a power transferred using interleave technique, suitable for the embodiments depicted in FIG. 10 and FIG. 20.

In FIG. 20 is presented a forward type configuration with energy transfer through the leakage inductance. The current through Do will have both slopes slow rising reducing the high frequency content of the output current. This topologies a perfect candidate for interleaving technology depicted in FIG. 21, in which each power train transfers the energy successively to the load.

Figure 22:
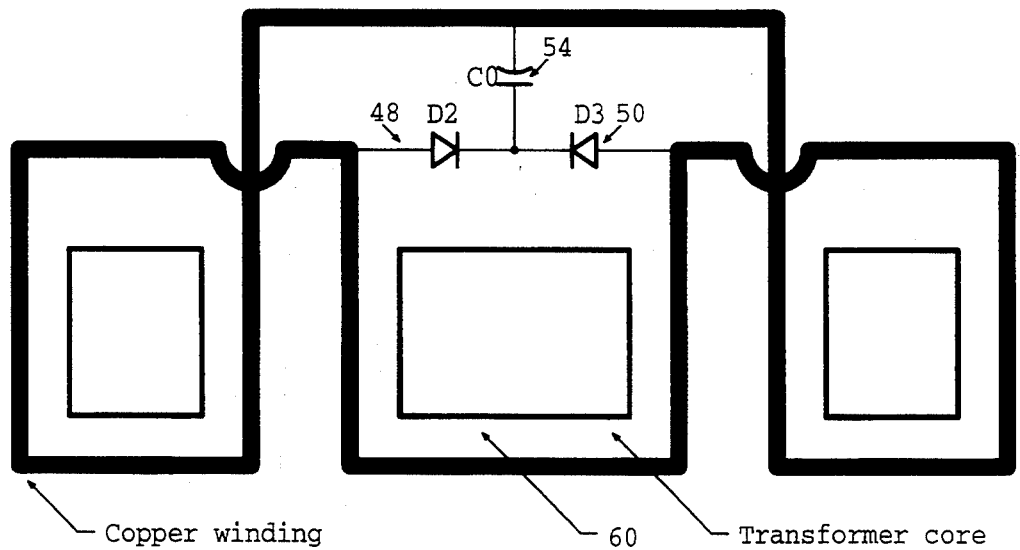
FIG. 22 is an implementation embodiment of the configuration described in FIG. 13 by using integrated magnetic.
Figure 23:
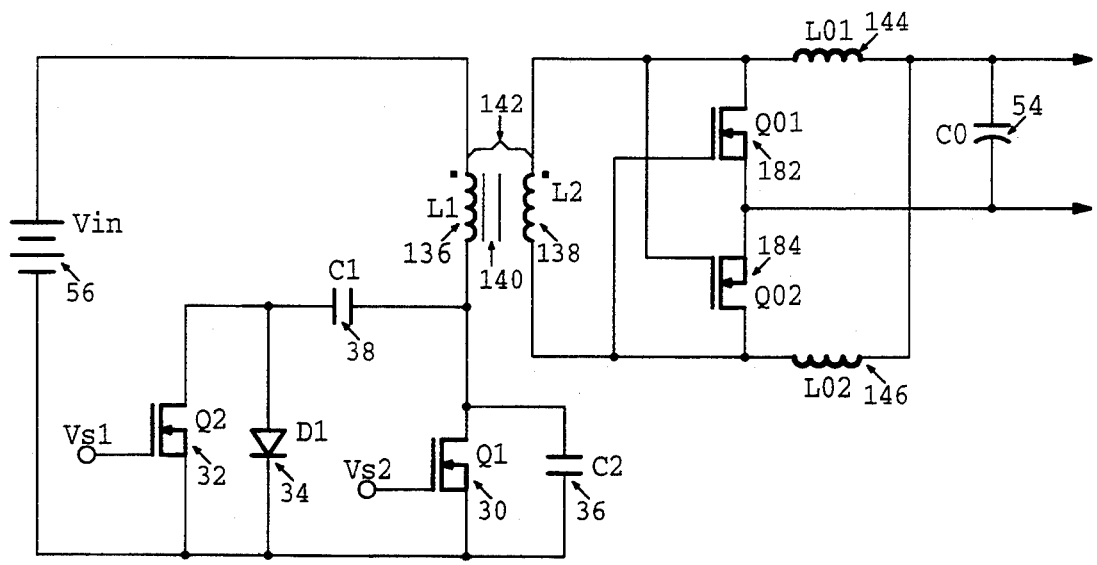
FIG. 23 is an embodiment in which synchronized rectifiers are employed.

In FIG. 22 is presented a implementation of the configuration depicted in FIG. 13, in which the secondary is reduced to one turn and the output inductors are implemented in the outer legs which are gapped. Many alternations and modifications may be made by those having ordinary skill in the art without departing from the spirit and scope of the invention. Therefore, the invention must be understood as being set forth above only for the purpose of example and not by way of limitation. For example, any kind of switch now known or later devised may be used, including N or P type FET power devices which may be substituted for the main and auxiliary switches, the carrier type of the main and auxiliary switches may be interchanged with each other, and the reset capacitor may be connected to the positive source or return. The invention is defined by the following claims wherein means may not obtained by performing substantially the same function in substantially the same way.

I claim:

1. A zero-voltage switching converter comprising:
   a DC or rectified AC voltage source;
   a transformer having primary and a tapped secondary winding;
   main switch means for selectively coupling said voltage source across said primary winding of said transformer;
   auxiliary switching means including an anti parallel diode for selectively allowing the voltage across said main switch means to reach zero, said main switching means and auxiliary switching means each having an OFF period and ON period, said auxiliary switching means being non conductive prior to said ON period of said main switching means by predetermined time period sufficient to allow the voltage across said main switch means to reach zero voltage, said auxiliary switching means remaining non conductive until said main switching means cycles through its corresponding ON period and half of OFF period;
   a reset capacitor coupled in series to the auxiliary switching means and primary ground of said converter;
   third switching means coupled in series with said one section of the said tapped secondary winding of said transformer for selectively remaining at least partially non conductive as the voltage across said main switching means decreases, said third switching means becoming conductive when the voltage across said main switching means reaches zero;
   a first rectifier means coupled in series with said third switching means for conducting current from said third switching means;
   a secondary rectifier means coupled with its anode to the another termination of said tapped secondary winding and with its cathode connected to the cathode of first rectifier means; and
   a control circuit for selectively operating said main switching means, auxiliary switching means and third switching means to transfer energy through said converter during both ON and OFF time of said main switching means by modification of the duty cycle of operation of at least said main and auxiliary switching means to achieve turn ON said switching means at zero voltage.

2. The converter of claim 1 wherein said first rectifying means and third switching means comprise a unidirectional controlled switch means, said unidirectional controlled switch means selectively operated by said control means so that said unidirectional controlled switching means is non conductive after the voltage across said main switching means reaches zero, and so that said unidirectional controlled switching means is conductive during said ON time of said switching means.

3. The converter of claim 1 wherein transformer comprises a plurality of tapped secondary windings.

4. The converter of claim 1 wherein said third switching means is a saturable reactor.

5. The converter of claim 1 wherein said third switching means is an inductor.

6. The converter of claim 1 wherein said third switch is connected in the primary side of the said transformer in series with said primary of said transformer.

7. The converter of claim 1 further comprising a load and a load inductor, said load inductor being coupled in series circuit between said common cathode of said first and second rectifying means and said load, said load coupled to the tap of said secondary tapped winding.

8. The converter of claim 1 further comprising:
   a load and two in phase coupled inductors which are electrically connected at one end, another ends of said coupled inductors are connected to the cathode of said first and said second rectifying means;
   the another ends of said coupled inductor which are shorted together is connected to the said load, said load coupled to the tap of said secondary tapped winding;

a supplementary rectifier means is connected with the cathode to the cathode of said first rectifier means and with the anode to said secondary winding tap.

9. The converter of claim 8 wherein a supplementary rectifier means is connected with the cathode to the cathode of said first rectifier means and the anode to the said secondary winding tap.

10. The converter of claim 9 wherein said third switch is substituted by the leakage inductance between said primary winding and said secondary winding of said transformer.

11. The converter of claim 1 wherein the said control circuit senses the voltage across the said main switch and turns ON the said main switch at zero voltage, by integrating the current through drain to gate capacitance of said main switch, together with the complementary signal currents which controls the said auxiliary switch.

12. The converter of claim 1 wherein said main switching means is replaced by two switching means, one between the input source and said primary winding of said transformer, and the second between the input return and the another end of said primary winding. Said reset capacitor which is connected at one end to said secondary switch, has the second end connected to said primary winding at the end connected to one of said main switching means towards the input voltage source.

13. A zero-voltage switching converter comprising:
 a DC or rectified AC voltage source;
 a transformer having primary and a secondary winding;
 a main switch for selectively coupling said voltage source across the said primary winding of said transformer;
 auxiliary switch means including an antiparrallel diode for selectively allowing the voltage across said main switching means to reach zero, said main switching means and auxiliary switching means each having an OFF period and ON period, said auxiliary switching means being non conductive prior to said ON period of said main switching means by predetermined time period sufficient to allow the voltage across said main switch to reach zero voltage, said auxiliary switching means remaining non conductive until said main switching means cycles through its corresponding ON period and half of OFF period;
 a reset capacitor coupled in series to the auxiliary switching means and primary ground of said converter;
 third switching means coupled in series with said secondary winding of said transformer for selectively remaining at least partially non conductive as the voltage across said main switching means decreases, said third switching means becoming conductive when the voltage across said main switching means reaches zero, or partially non conductive for a determined period of time;
 a control circuit for selectively operating said main switching means, auxiliary switching means and third switching means to transfer energy through said converter by modification of duty cycle of operation of at least said main and auxiliary switching means to achieve turn ON of said main switching means at zero voltage.

14. The converter of claim 13 wherein the energy transfer is done during the ON time of said main switching means.

15. The converter of claim 13 wherein the energy transfer is done during the OFF time of said main switching means.

16. The converter of claim 13 wherein the third switching means is a inductor in series with a rectifier means.

17. The converter of claim 13 wherein the third switching means is a synchronized switch.

18. The converter of claim 13 wherein the third switch is composed by:
 a first rectifier means in series with a inductance, and a secondary rectifier means connected to the another end of said secondary and to said first rectifier means with common cathode or anode connection at the end not electrically connected to said secondary winding;
 two supplementary inductors and a load, the said inductors are connected in series and non common ends are connected to the ends of said secondary winding and the said load is connected between the common connection of two said inductors and the common connection of said first and second rectifier means.

19. The converter of claim 18 wherein the two said supplementary inductors are implemented on the outer legs of the core of said transformer, by gapping the outer legs of said core.

20. The converter of claim 18 wherein the said first and second rectifier means are synchronized rectifiers, and the control voltages are the ends of said output winding.

21. The converter of claim 13 wherein said control means comprises sensory means for sensing input voltage, input current and output voltage, said control means maintaining a constant voltage across said lead and forcing the input current to follow a desired shape by varying said ON period of said main switching means.

22. The converter of claim 13 wherein the first rectifying means is replaced by a bridge of diodes.

* * * * *